United States Patent
Liu

(10) Patent No.: US 6,393,050 B1
(45) Date of Patent: May 21, 2002

(54) TRANSMIT/RECEIVE SWITCH FOR 10BASE-T HOME NETWORK

(75) Inventor: Ce Richard Liu, Sugarland, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/183,145

(22) Filed: Oct. 30, 1998

(51) Int. Cl.$^7$ .............................. H04B 1/38; H04L 5/16
(52) U.S. Cl. ..................... 375/219; 375/220; 375/222
(58) Field of Search ................................ 375/219, 220, 375/222; 379/171, 172, 173; 370/445, 447, 282, 293, 296

(56) References Cited

U.S. PATENT DOCUMENTS

| | | | |
|---|---|---|---|
| 4,466,106 A | * 8/1984 | Serrano ........................ | 375/9 |
| 4,509,164 A | * 4/1985 | Mouftah ....................... | 370/29 |
| 4,606,051 A | 8/1986 | Crabtree et al. .............. | 375/86 |
| 4,924,479 A | * 5/1990 | Iwao et al. ..................... | 375/7 |
| 5,347,225 A | 9/1994 | Graham ........................ | 324/523 |
| 5,365,515 A | 11/1994 | Graham ........................ | 370/17 |
| 5,379,005 A | 1/1995 | Aden et al. ................... | 333/24 |
| 5,422,919 A | 6/1995 | Graham ........................ | 375/200 |
| 5,450,594 A | 9/1995 | Aden et al. ............. | 395/200.06 |
| 5,467,061 A | 11/1995 | Aden et al. ................ | 333/24 R |
| 5,550,506 A | 8/1996 | Tsumura ...................... | 329/304 |
| 5,587,692 A | 12/1996 | Graham et al. ............... | 333/12 |
| 5,696,790 A | 12/1997 | Graham et al. ............. | 375/238 |
| 5,787,115 A | * 7/1998 | Turnbull et al. ............ | 375/222 |

OTHER PUBLICATIONS

Texas Instrumemts; "Implenting a π/4 Shift D–QPSK Baseband Modem Using the TMS320C50"; Sep. 1996; pp. 1–40.
3Com Corp. website, Robyn Aber; "xDSL Supercharges Copper"; Mar. 1997; pp. 1–5.
Tut Systems website; "Simply delivering xDSL . . . connecting the local loop to the campus, the high rise and throughout the home."; website update Nov. 3, 1997; pp. 1–6.

Zona Research, Inc.; "Compaq Hits Homerun with Tut"; Aug. 11, 1998; pp. 1–2.

* cited by examiner

Primary Examiner—Mohammad H. Ghayour
(74) Attorney, Agent, or Firm—Conley, Rose & Tayon, P.C.

(57) ABSTRACT

An apparatus and method is disclosed for providing 10BASE-T Ethernet compatible data communications between multiple network elements, such as computers, computer peripherals, computerized appliances, and the like, over a two wire residential phone line. Each network element may include a 10BASE-T compatible network interface card (NIC) for interfacing between the network element and the residential phone line through the device of the present invention. A transmit/receive switch, set to a default receive position, is coupled between the two wire residential phone line and a NIC, each NIC having a transmit and receive wire pair. The NIC senses receive energy originating from the residential phone lines. When receive energy is no longer sensed at the NIC, a transmit signal may be generated by the NIC, placed on the transmit wire pair. A carrier sensor having a control logic unit changes the transmit/receive switch to transmit position when the transmit signal is detected, coupling transmit data through the switch to the residential phone line. The carrier sensor/control logic unit returns the transmit/receive switch to the receive position to resume carrier sensing in accord with CSMA/CD protocol specifications on the two wire medium.

14 Claims, 3 Drawing Sheets

TRANSMIT/RECEIVE SWITCH FOR 10BASE-T HOME NETWORK

FIELD OF THE INVENTION

The present invention relates to home network computer systems, and more particularly, but not by way of limitation, to a transmit/receive switch utilized in a 10Base-T Ethernet data communications system, that provides data communication between computers and peripherals over a two-wire medium.

BACKGROUND OF THE INVENTION

As more appliances and items in the home become computer controlled, and as more homes obtain multiple computer systems with associated peripherals, the importance of a home network for allowing data communications between computer systems, automated appliances, and peripherals within a home is increasing. While many high speed networking alternatives are available for businesses, which generally have a greater capability for investment in networking resources, choices for a home network are limited by practical and economic factors common to the typical household. Systems designed especially for home networking may require expensive custom hardware having marginal or negligible performance advantages giving rise to unattractive price vs. performance tradeoffs. On the other hand, the cost associated with rewiring a home to provide cable capable of carrying signals at network frequencies typical of existing network technology, such as Baseband Ethernet, using existing network hardware can be prohibitive for most households.

Baseband Ethernet technology is commonly used in businesses for providing network connectivity, and has evolved into successively more robust forms over many years. One commonly used baseband Ethernet technology is know as the 10BASE-T network. The 10BASE-T network has an operating rate of 10 Mbps, is compliant with LAN 802.3 standards and specifications, and thereby provides moderate to high speed interconnectivity between many workstations and peripherals for most applications.

In a conventional business LAN application, workstations and peripherals, such as printers and disk towers are wired together to allow shared access, data transfer, and communication between individual user workstations and network devices. A typical 10BASE-T network interface card (NIC) is located at each workstation and network device and accommodates two pairs of unshielded twisted-pair wire. Under the 10BASE-T standard, one twisted pair is used for data transmission and one twisted pair is used for data reception. Due to the specialized nature of the interface circuitry and the common mode noise rejecting capability of the "twisted" configuration of the actual wire pair or, alternatively, the noise rejecting capability of shielded coaxial cable, relatively high data rates may be achieved. In the typical home however, existing coaxial cables for cable TV service cannot be used to transmit data because of the resulting signal interference, and twisted wires pairs are unavailable. Accordingly, high data rate networks are not possible without expensive rewiring.

One solution to the home networking problem has been to use existing phone lines to transmit data. Conventional subscriber line wire pairs however, are traditionally contemplated for narrow band voice transmission in the range of 0 to 4 KHz. Physical limitations arise related to, for example, signal-to-noise ratio, which have traditionally limited the maximum frequency capable of being transmitted over normal phone lines, making it possible for only relatively low data rate signals to be transmitted. As a result of such limitations, the overall cost and complexity of bringing high data rate network communications to the home environment has typically been prohibitive, although some home network systems have been attempted.

One example of a prior art home network is the TUT Systems, HR1300T. The HR1300T uses a "time modulation line code" to provide an in-home network over existing phone lines with a modulation scheme providing a data rate of 1.3 Mbps. While 1.3 Mbps provides an improvement over the data rates achievable with, for example, standard modem technology, the HR1300T requires a proprietary protocol incompatible with 10Base-T Ethernet standards. Accordingly, CSMA/CD protocols cannot be implemented.

Other proposed solutions to home networking include standard modem technology, digital subscriber line (XDSL) technology, and wireless technology. Standard modem technology has traditionally been limited to data speeds of 56 kbps and requires very complicated circuitry and high quality line characteristics not reliably available in a typical home. Although, xDSL technology can transmit data at a much higher rate than standard modem technology, up to 4 Mbps, the cost of implementation of xDSL is very high and requires very complicated modulation methods. High quality line characteristics, such as signal-to-noise ratio, may also be required with xDSL technology to meet theoretical objectives.

Wireless solutions allow for connectivity between elements, typically using frequencies around 900 MHz, but have certain drawbacks. Since wireless portable phones and are often operated in neighboring bands there is a high likelihood of signal interference between a wireless LAN and portable phones or household devices such as, televisions, computers, garage door openers, alarm systems, and the like. Moreover, CSMA/CD protocols, essential to proper handshaking and collision avoidance between network elements, are far more difficult to implement and more unreliable in a wireless application. Without reliable compliance with CSMA/CD protocols a properly functioning, standards compliant 10Base-T network will not be possible.

CSMA/CD is an acronym for "Carrier Sense Multiple Access with Collision Detection". In a CSMA/CD network, transmission channels are normally open for transmission on a continuous space available basis. Devices communicate when necessary, subject to whether the transmission media is clear, essentially "competing" for transmission time. Since Ethernet protocols are largely packet based, and packets are generally designed to be relatively small (1Kbyte), a given device is not expected to occupy a channel for an inordinate amount of time. It is still possible, due for example to propagation delay, for collisions to occur even though the protocol is designed to avoid collisions.

A conventional four wire 10Base-T Ethernet network with CSMA/CD typically avoids collisions by sensing the presence of a signal on the receive pair at the network interface controller (NIC) and inhibiting transmissions initiated by the NIC over the transmit pair during such intervals. If a collision occurs, an Ethernet compliant network device immediately stops the transmission of a frame as soon as a collision has been detected. By stopping the transmission, greater efficiency is achieved. To recover from the collision, the network device waits an interval then retransmits. If a collision occurs on the second attempt, the device waits for a longer interval before retransmitting. The process of waiting for progressively longer intervals is called "backoff." Each time the device senses a collision on a subsequent transmit attempt, the time between making a transmission attempt will be increased by a small constant factor, leading to "exponential backoff." After a limit is reached, data is simply lost.

Because, a typical Ethernet NIC has four wires, a two wire transmit pair and a two wire receive pair which are wired at all times to the network, the CSMA/CD protocol is active at all times. A problem arises however in the home network environment where only a single pair of wires is available. In such an environment, CSMA/CD has not been possible since only one of the two pairs may be connected to the two wire phone line at one time.

Therefore, as can be appreciated, there is a need to provide a CSMA/CD compliant home network that is easy-to-install-and-use, that is available at a low cost, and that can provide high data rates while taking advantage of existing two wire phone lines.

SUMMARY OF THE INVENTION

The present invention overcomes the above identified problems as well as other shortcomings and deficiencies of existing technologies by providing CSMA/CD compliant 10Base-T Ethernet data communications over an ordinary two wire phone line.

An apparatus and method for practicing thereupon include a transmit/receive switch coupled between a network interface controller (NIC), having a transmit and receive wire pair, and a two wire medium such as a residential phone line. The transmit/receive switch, in the default position, may be set to normally receive. The NIC senses receive energy originating from the two wire media through the connection provided by the transmit/receive switch, in the default position, between the switch common and the receive wire pair. When receive energy is no longer sensed at the NIC, a transmit signal may be generated by the NIC, placed on the transmit wire pair and sensed by a carrier sensor having a control logic unit. In response to detecting transmit signal energy, carrier sense/control logic unit changes the transmit/receive switch to transmit position and transmit data may be coupled through the switch to the two wire medium. Upon completion of data transmission, the carrier sensor/control logic unit returns the transmit/receive switch to the receive position in order to resume carrier sensing in accordance with CSMA/CD protocol specifications on the two wire medium.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
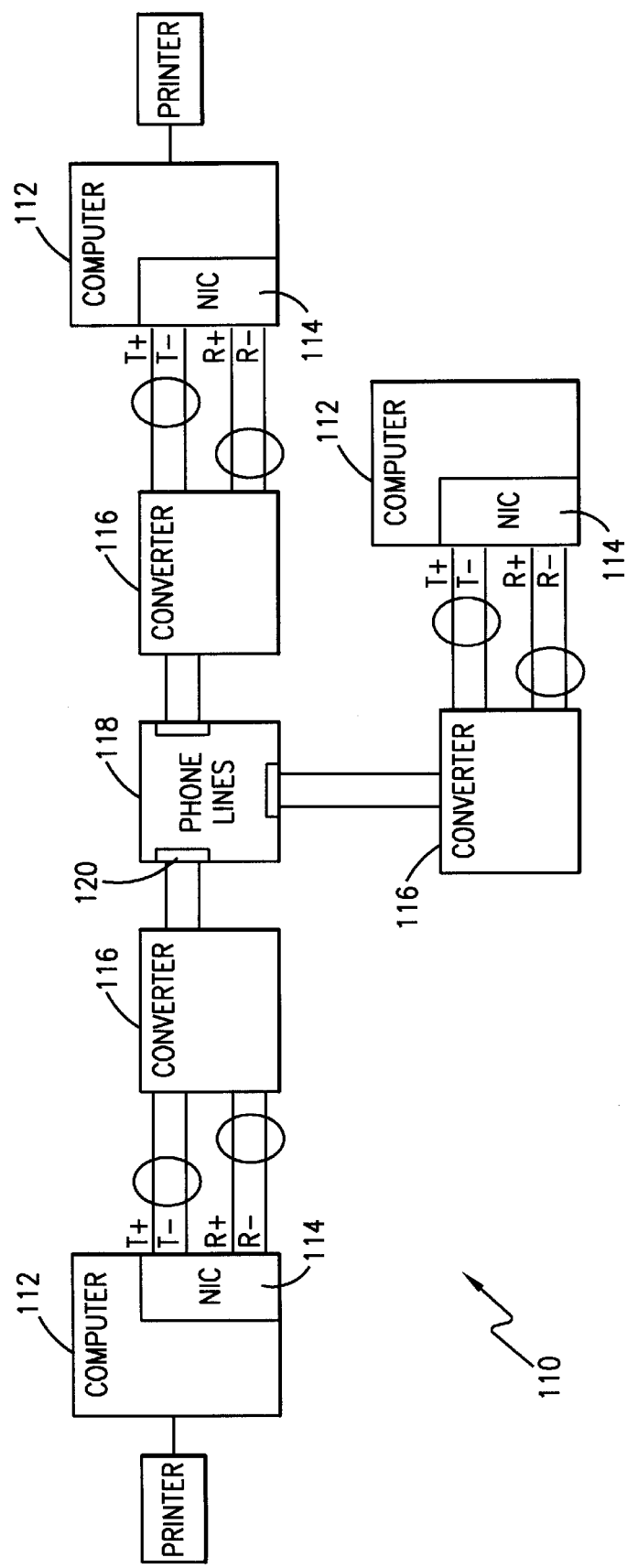
FIG. 1 is a block diagram illustrating an exemplary home network.

With reference to FIG. 1, there is shown a block diagram of home network 110 which may provide relatively high rate data communications between multiple computers 112 and peripherals which may be interconnected using a two wire medium, such as residential phone lines 118. Each of the computers 112 includes a network interface controller (NIC) 114 having transmit and receive wire pairs which is further connected to a converter, such as converter 116 for converting conventional transmit and receive signals into signals which are compatible with transmission and reception using a two wire medium and which is described in further detail hereinafter. Each converter 116 for NIC 114 associated with each computer 112 or network element, such as a computer peripheral or computerized appliance, is connected to residential phone lines 118 through a standard phone jack 120.

Residential phone lines 118 may be considered to be the collection of interconnected phone pairs, including all drops, extensions, wall plugs, and the like associated with a single residential telephone subscriber service pair found in virtually all homes for providing standard residential telephone subscriber service. Residential phone lines 118 provide the physical interconnectivity between devices through each converter 116, while each NIC 114 provides interface between the physical network and each computer 112 and associated peripherals, computerized appliances and the like comprising home network 110. Each NIC 114 is a standard 10BASE-T network interface card. As is appreciated by those skilled in the art, a standard 10BASE-T NIC provides transmit and receive data communications over two dedicated channels coupled to a first and second twisted pair. The first twisted pair is for transmission of data (T+, T−) and the second twisted pair is for receiving data (R+, R−).

Still referring to FIG. 1, each converter 116 is disposed between each NIC 114 and residential phone lines 118, allowing data to be transmitted between each of computers 112 over residential phone lines 118 at a data transfer rate of around 10 Mbps in accord with 10Base-T Ethernet LAN specifications. In the exemplary embodiment of the present invention, it is preferred that each converter 116 provide data communication between each of computers 112 such that it appears to each of computers 112 and corresponding NIC 114 that the data being received is in accord with 10BASE-T Ethernet LAN specifications.

Figure 2:
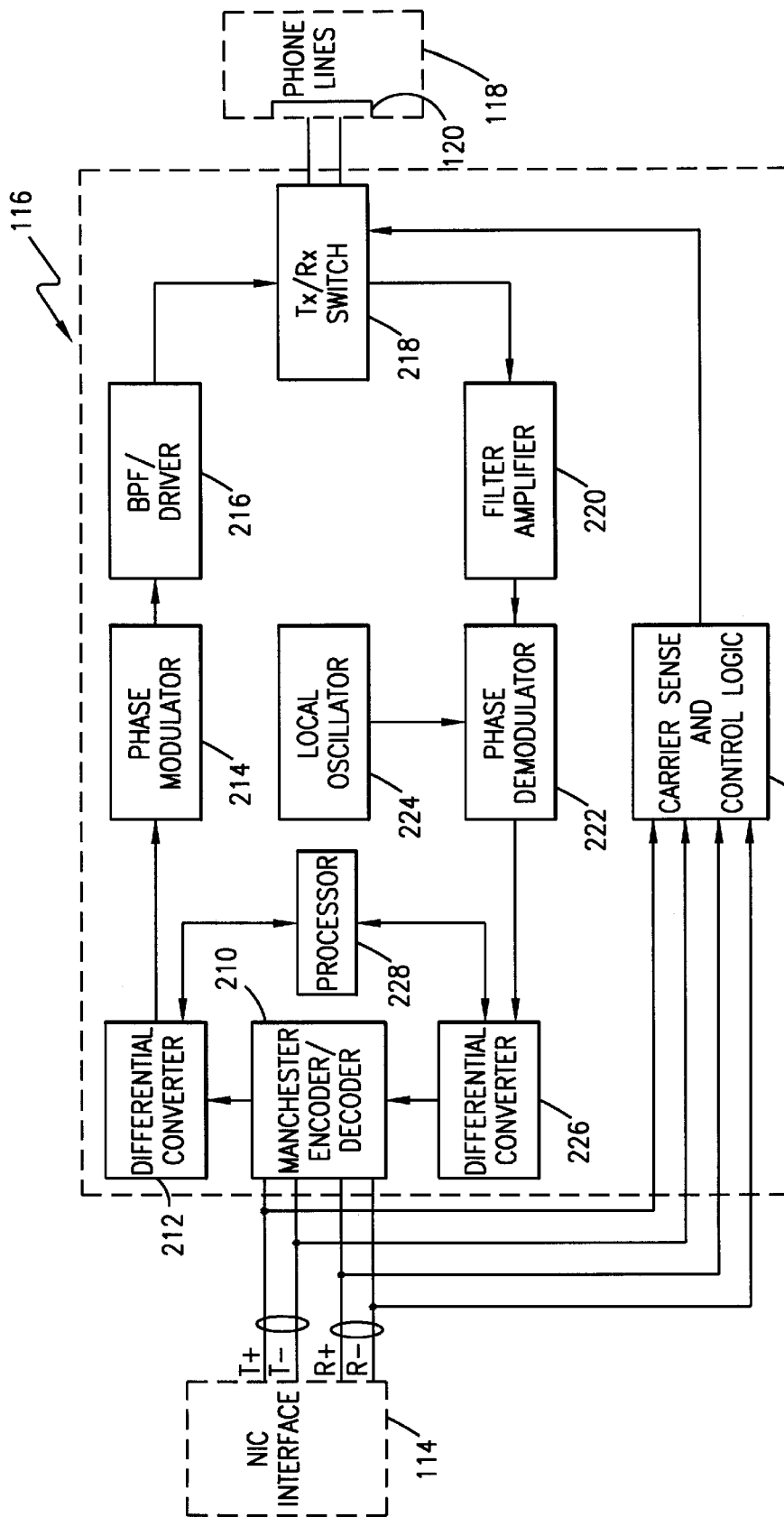
FIG. 2 is a more detailed block diagram further illustrating an exemplary converter in accord with the present invention.

Referring now to FIG. 2, there is illustrated a more detailed exemplary embodiment of a converter 116 as similarly shown in FIG. 1. As depicted, converter 116 includes the following: a Manchester encoder/decoder 210; a differential converter 212; a phase modulator 214, a bandpass filter/driver 216; a transmit/receive switch 218; a filter/amplifier 220; a phase demodulator 222; a local oscillator 224; a differential converter 226; a control processor 228; and carrier and control logic 230. As depicted, converter 116 is coupled between NIC 114 and phone jack 120 of residential phone lines 118. Converter 116 is operable in two modes, a transmit mode and a receive mode corresponding to the position of transmit/receive switch 218. The default mode of converter 116 is the receive mode with transmit/receive switch 218 in the receive position in which residential phone lines 118 are monitored for signal energy originating from a remote transmitter. If a signal is generated for transmission by NIC 114 through converter 116, part of the signal energy may be detected by carrier sensor and control logic 230 to enable converter 116 to switch to transmit mode but only when there are no signals present on residential phone lines 118. If no signals are sensed on residential phone lines 118, carrier sensor and control logic 230 will switch transmit/receive switch 218 into transmit position.

As described herein above, NIC 114 uses two twisted wire pairs, one pair for transmitting data signal pair (T+, T−), and the other or receiving data signal pair (R+, R−). NIC 114 transmits data (T+, T−), which in accord with 10Base-T Ethernet specifications is Manchester encoded, to Manchester encoder/decoder 210 where the transmit data signals are decoded to a conventional data stream. The decoded data stream is then input to differential converter 212 where the data stream is converted into a differential encoded data stream.

The differential encoded data is then sent to phase modulator 214. Phase modulator 214 generates a phase modulated radio frequency (RF) signal corresponding to the differentially encoded data using a phase modulation scheme such as differential binary phase shift keying (DBPSK), differential quadrature phase shift keying (DQPSK). Although good results have been achieved using a carrier center frequency of around 30 MHZ with a frequency range of either 21.2–38.8 MHZ for DBPSK or a frequency range of 25.6–34.4 MHZ for DQPSK, the center frequency and frequency ranges described are not intended to limit the present invention. Moreover, DBPSK and DQPSK modulation schemes at the described center frequencies and associated frequency ranges allow data to be communicated over residential phone lines 118 with minimal noise interference and in a manner which minimizes interfering with POTS and xDSL signals which may be present on residential phone lines 118 during signal transmission. Although the present invention uses phase modulation, it is contemplated that other types of modulation schemes could be used, for example, multicarrier modulation (MCM) and quadrature amplitude modulation (QAM).

The modulated data signal is then be sent to bandpass filter/driver 216 where the modulated data signal is filtered and amplified primarily to account for impedance matching between converter 116 and residential phone lines 118. Ultimately, the data signal is sent through transmit/receive switch 218 to residential phone lines 118 after switching the position of transmit/receive switch 218 to the transmit position as previously described. When carrier sense and control logic 230 detects that NIC 114 is finished transmitting the data signal, carrier sense and control logic 230 will switch transmit/receive switch 218 back to the receive mode, the default mode. In the default receive mode, NIC 114 will be inhibited from transmitting data should carrier sense control logic 230 determine that there is energy on residential phone lines 118. Moreover, as described, carrier sense and control logic 230 senses a portion of the energy on the T+, T– signal line and transfers transmit/receive switch 218 from the default receive position to the transmit position.

When receiving modulated data signals from residential phone lines 118, the modulated signal is bandpass filtered and amplified by filter/amplifier 220. Filtering may be used to match impedance with phone line 118. The filtered signal may then be demodulated by phase demodulator 220 using the corresponding demodulation scheme. For example, if the signal was phase modulated using DQPSK, then a corresponding DQPSK demodulation scheme may be used to regenerate the differential encoded data stream. The demodulated differential encoded signal is then converted back into conventional data streams using differential converter 226. The converted data is finally encoded using Manchester encoder/decoder 210 and sent to NIC 114 over R+ and R– as a Manchester encoded data signal which is what is expected by NIC 114 in accordance with 10Base-T Ethernet standards. Baseband processor 228 primarily controls three functions, the differential decoding and encoding performed by differential converters 212 and 226 as well as clock recovery with local oscillator 224. In the "transmitting path" when data signals are being sent from NIC 114 through converter 116 as described hereinabove, they will have known clock information which is recovered with local oscillator 224.

In addition to frequency and modulation considerations which must be adhered to for 10Base-T Ethernet standards compliance, CSMA/CD considerations must also be taken into account. As described hereinabove, carrier sense and control logic 230 is used to reposition transmit/receive switch 218 between transmit position and receive position. Conventional 10Base-T Ethernet communications, as described, are based on separate transmit and receive channels. Such a two channel configuration allows for simultaneous monitoring of receive channel energy to permit or inhibit transmission over the transmit channel based on the absence or presence of receive signal energy. If NIC 114 wants to "talk", carrier sense and control logic 230 must determine if residential phone lines 118 are clear of transmissions from other network elements. Hence, carrier sensing is used to determine if there is energy in the carrier band which would indicate a transmission in progress. In a conventional four wire system having a transmit and receive wire pair, the detection of energy on the receive wire pair is generally all that is required to control when transmission can occur over the separate transmit wire pair. In the two wire system of the present invention, the CSMA/CD protocol must be maintained while sharing a single wire pair as represented by residential phone lines 118.

Figure 3:
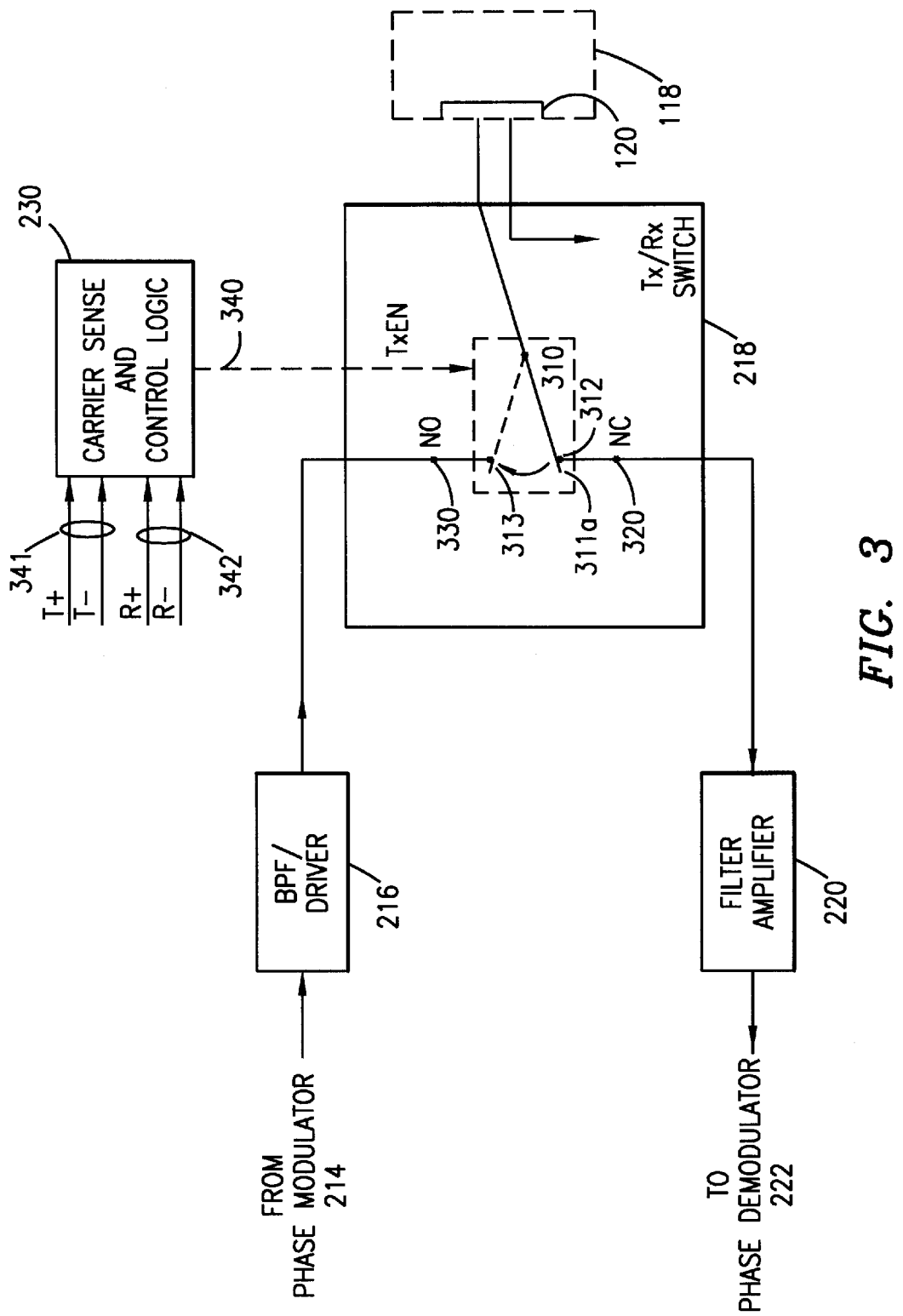
FIG. 3 is a more detailed schematic block diagram illustrating an exemplary transmit/receive switch in accord with the present invention.

Referring now to FIG. 3 of the drawings, a more detailed schematic block diagram of transmit/receive switch 218 is illustrated. Transmit/receive switch 218 may be a Single Pole Double Throw (SPDT) analog switch capable of coupling either the two wire transmit or two wire receive channels to a two wire medium. In the preferred embodiment, transmit/receive switch 218 may be coupled to residential phone lines 118 through the switch common 310. Switch common 310 may be connected to switch pole 311 for switching between the Normally Closed (NC) contact 312 and the Normally Open (NO) contact 313. As described hereinabove, NC contact 312 may be connected to the receive channel 320 where receive data signals may be transferred to the downstream elements in, for example, converter 116. In the preferred embodiment, NC contact 312 may be connected through receive channel 320 to filter amplifier 220. By having NC contact 312 connected through switch common 310 to residential phone lines 118, carrier energy on residential phone lines 118 may be constantly monitored. If energy is detected, generally at the R+ and R– terminals of NIC 114, as shown in FIG. 2, NIC 114 may be inhibited from transmitting data either at the switch using carrier sense and control logic 230 or at NIC 114 using built in logic. In the preferred embodiment, NIC 114 is equipped with built in logic for inhibiting transmission when receive energy is detected on R+ and R–. By allowing NIC 114 to manage this portion of the CSMA/CD protocol, backoff protocols may be instituted in the event NIC 114 is inhibited from transmission.

When no signal energy is detected on R+ and R– signal lines, residential phone lines 118 are clear for transmission. If NIC 114 wants to send a packet during the clear interval, Manchester encoded data signals are generated on T+ and T– and sent to Manchester Encoder/Decoder 210 for decoding. A portion of the energy from T+ and T– is sent to carrier sense and control logic 230 where, if no energy is present on R+ and R–, a logic 1 on transmit enable logic signal TxEN 340 may be generated to change the position of switch pole 311 from NC contact 312 to NO contact 313. Changing the position of transmit/receive switch 218 connects switch common 310 from default receive channel 320 to transmit channel 330. When the transmission is completed as sensed by carrier sense and control logic 230, a logic 0 is generated on TxEN 340 to return switch pole 311 to NC contact 312 to enable receive channel 320 to resume monitoring residential phone lines 118 as illustrated in the simple state table shown in Table 1.

TABLE 1

| TxEN State | Switch State |
|---|---|
| 0 | Receive (NC) |
| 1 | Transmit (NO) |

By employing transmit/receive switch 218 in the manner described hereinabove, the present invention may comply with the CSMA/CD protocol in accord with 10Base-T LAN specifications, further in accord with IEEE 802.3 specifications over a two wire medium such as residential phone lines 118.

Those skilled in the art can realize that the teachings of the present invention as described hereinabove provides a method and apparatus that enables 10Base-T Ethernet compatible data communications between computers and peripherals over an ordinary analog subscriber phone line service pair without conflicting with other signals, such as POTS and xDSL signals, which may be concurrently transmitted over the same phone line. It can be further appreciated that the present invention enables 10BASE-T compatible data communications by employing a transmit/receive switch used to switch the device between a transmit mode and a receive mode and comply with CSMA/CD protocols.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A device for providing data communications over a two-wire medium between at least two units, each unit having a network controller for transmitting and receiving data, the network controller including a transmit wire pair and a receive wire pair, the device comprising:

a carrier detector for detecting signal energy on the receive wire pair and further for inhibiting the network controller from transmitting data responsive to the detection of signal energy; and a transmit/receive switch coupled to the carrier detector, the transmit wire pair, the receive wire pair, and the two wire medium, the transmit/receive switch for selectively coupling the transmit wire pair and the receive wire pair to the two-wire medium.

2. The device as recited in claim 1, wherein the transmit/receive switch further includes a transmit position and a receive position, the transmit position forming a connection between the transmit wire pair and the two-wire medium for carrying a transmit signal, the receive position forming a connection between the receive wire pair and the two-wire medium for carrying a receive signal, and wherein the transmit/receive switch is normally positioned in the receive position.

3. The device as recited in claim 2, wherein the carrier detector further includes a control logic unit.

4. The device as recited in claim 3, wherein the control logic unit is configured to generate a signal for changing the position of the transmit/receive switch from the receive position to the transmit position, and wherein the generation of the signal is responsive to the control unit detecting energy on the transmit wire pair.

5. The device as recited in claim 1, wherein the two wire medium is a residential phone line.

6. The device as recited in claim 2, wherein the transmit signal is phase modulated and wherein the receive signal is phase modulated.

7. A method for providing 10 Base-T Ethernet compatible data communications over a two-wire medium between at least two units, each unit having a network controller for transmitting and receiving data, the network controller including a transmit wire pair and a receive wire pair, the method comprising the steps of:

detecting signal energy on the receive wire pair; and selectively coupling the transmit wire pair and the receive wire pair to the two-wire medium so as to inhibit the network controller from transmitting data while signal energy is detected on the receive wire pair.

8. The method as recited in claim 7, wherein the step of selectively coupling further includes:

switching between a transmit position and a receive position of a switch, the transmit position connecting the transmit wire pair and the two-wire medium for carrying a transmit signal therebetween, the receive position connecting between the receive wire pair and the two-wire medium for carrying a receive signal therebetween; and positioning the switch such that the switch default position is in the receive position.

9. The method as recited in claim 8, wherein the step of selectively coupling further includes:

generating a signal for changing the position of the switch from the receive position to the transmit position responsive to detecting energy on the transmit wire pair.

10. An interface device for coupling a two-wire phone line to a network card having a transmit wire pair and a separate receive wire pair, the device comprising:

a switch coupled to the two-wire phone line, wherein the switch is configured to couple a transmit signal to the two-wire phone line only when a transmit mode signal is asserted, and is configured to couple the two-wire phone line to a receive amplifier only when the transmit mode signal is de-asserted; and a carrier detector coupled to the receive amplifier to detect receive signal energy, coupled to the transmit wire pair of the network card to detect transmit signal energy, wherein the carrier detector asserts the transmit mode signal to the switch only when the detected receive signal energy indicates no receive signal is present and the detected transmit signal energy indicates a transmit signal is present.

11. The device of claim 10, further comprising:

a demodulator coupled to the receive amplifier and configured to convert a receive signal to a stream of baseband receive data; and an encoder coupled to the demodulator to receive the stream of baseband receive data and configured to convert the baseband receive data into an encoded receive signal that is provided to the network card on the receive wire pair.

12. The device of claim 11, further comprising:

a decoder coupled to the transmit wire pair to receive an encoded transmit signal, and configured to convert the encoded transmit signal into a stream of baseband transmit data; and a modulator coupled to the decoder to receive the stream of baseband transmit data and configured to convert the stream of baseband transmit data into a transmit signal that is provided to the switch.

13. The device of claim 12, wherein the encoded transmit and encoded receive signals are 10Base-T Ethernet compatible signals.

14. The device of claim 12, wherein the transmit and receive signals are differential phase shift keying signals modulated on a carrier frequency of about 30 MHz.

* * * * *